US009712359B2

(12) United States Patent

Snyder et al.

(10) Patent No.: US 9,712,359 B2

(45) Date of Patent: Jul. 18, 2017

(54) SYSTEM AND METHOD FOR COMMUNICATION USING AMBIENT COMMUNICATION DEVICES

(75) Inventors: Seth Snyder, Providence, RI (US); Katie Wray, Providence, RI (US)

(73) Assignee: Humana Inc., Louisville, KY (US)

( * ) Notice: Subject to any disclaimer, the term of this patent is extended or adjusted under 35 U.S.C. 154(b) by 594 days.

(21) Appl. No.: 12/768,474

(22) Filed: Apr. 27, 2010

(65) Prior Publication Data

US 2016/0359651 A1 Dec. 8, 2016

Related U.S. Application Data

(60) Provisional application No. 61/173,997, filed on Apr. 30, 2009.

(51) Int. Cl.

*G06F 15/16* (2006.01)
*H04L 27/26* (2006.01)
*G08B 21/02* (2006.01)
*A63H 3/28* (2006.01)

(52) U.S. Cl.

CPC ............ *H04L 27/2611* (2013.01); *A63H 3/28* (2013.01); *G08B 21/0202* (2013.01); *A63H 2200/00* (2013.01)

(58) Field of Classification Search

CPC ....... H04L 12/282; G06F 3/04847; G06F 3/07
USPC ........ 709/204, 205, 206, 247; 715/701, 716, 715/863, 702, 704, 753, 760
See application file for complete search history.

(56) References Cited

U.S. PATENT DOCUMENTS

| | | | | | |
|---|---|---|---|---|---|
| 6,773,344 | B1 * | 8/2004 | Gabai | ...................... A63H 3/28 | 463/1 |
| 6,800,013 | B2 * | 10/2004 | Liu | .......................... A63H 3/28 | 446/297 |
| 7,752,544 | B2 * | 7/2010 | Cheng | .................. A61B 5/0002 | 700/245 |
| 2004/0049393 | A1 * | 3/2004 | Duran | ................. H04M 1/7255 | 704/275 |

(Continued)

OTHER PUBLICATIONS

DiSalvo, Carl et al. The Hug: An exploration of Robotic form, Carnegie Mellon University, Pittsburgh, PA 2003 pp. 1-6.*

(Continued)

*Primary Examiner* — Dhairya A Patel

(74) *Attorney, Agent, or Firm* — Standley Law Group LLP

(57) ABSTRACT

Interactive communication devices in communication with a central server support ambient communications between two or more remotely located users. Each device has embedded sensors, lights, and speakers. The sensors allow the device to sense 'outgoing' interaction (e.g., a squeeze or hug), and the lights and speakers allow the device to demonstrate 'incoming' interaction. A central device is activated when someone interacts with any of the other devices within the network. The other devices in the network—the peripheral devices—are activated both when the interaction originates from the central device as well as from the other peripheral devices. When the server determines that a user has interacted with one of the devices, messages are sent to other devices in the network to reflect the user interaction. The communication devices allow the users in the network to send messages to each other by simply squeezing their respective devices.

12 Claims, 3 Drawing Sheets

(56) References Cited

U.S. PATENT DOCUMENTS

| | | | | | |
|---|---|---|---|---|---|
| 2006/0234602 | A1* | 10/2006 | Palmquist | A63H 3/003 | 446/297 |
| 2007/0063849 | A1* | 3/2007 | Rosella | A41D 1/002 | 340/573.1 |
| 2007/0146782 | A1* | 6/2007 | Lehotsky | H04L 41/0886 | 358/1.15 |
| 2009/0055019 | A1* | 2/2009 | Stiehl | B25J 9/1671 | 700/249 |
| 2011/0205081 | A1* | 8/2011 | Chen | H04Q 9/00 | 340/870.01 |

OTHER PUBLICATIONS

Modilitba, Lisa, Globetodle: Enhancing the experience or remote interaction, MIT, Sep. 2008.*

Modlitba, Lisa, Globetoddler: Enhancing the experience or remote interaction, MIT, Sep. 2008.*

DiSalvo, Carl et al. The Hug: An exploration of Robotic form, Carnegie Mellon Univeristy, Pittsburgh, PA 2003 pp. 1-6.*

Disalvo, Carl; Gemperle, Francine; Forlizzi, Jodi; and Montgomery, Elliott, The Hug: An Exploration of Robotic Form for Intimate Communication, School of Design, Institute for Complex Engineered Systems, Human-Computer Interaction Institute, Carnegie Mellon University, Pittsburgh, PA, USA, Ro-Man 2003 Conference Proceedings of the 12th International IEEE Workshop on Robot and Human Interactive Communication, San Francisco, CA, Oct. 2003.

Modlitba, Lisa Paulina, Globetroddler: Enhancing the experience of remote interaction for preschool children and their traveling parents, Submitted to the Program in Media Arts and Sciences, School of Architecture and Planning, Massachusetts Institute of Technology, Sep. 2008.

* cited by examiner

SYSTEM AND METHOD FOR COMMUNICATION USING AMBIENT COMMUNICATION DEVICES

CROSS-REFERENCE TO RELATED APPLICATIONS

This application claims priority to U.S. Provisional Application Ser. No. 61/173,997, filed Apr. 30, 2009, titled SYSTEM AND METHOD FOR COMMUNICATION USING AMBIENT COMMUNICATION DEVICES, the content of which is incorporated by reference as if fully recited herein.

FIELD OF THE INVENTION

The present invention relates generally to computerized communication systems and methods. In particular, the disclosed embodiments relate to interactive communication devices that support ambient communications between remotely located users.

BACKGROUND OF THE INVENTION

It is common today for the generations of a family to live in different neighborhoods, cities, states, and even countries. Similarly, an increasing number of divorces as well as job-related travel requirements cause family members to be separated for varying periods of time. Although staying connected across distances is facilitated with the use of mobile phones and computers, there are practical limitations to the types of communications and interactions that family members can have using these devices. The devices require users to have a certain level of physical as well as mental dexterity. The family members that use them must be able to dial, type, talk, etc. As a result, older family members may have difficulty using them and very young family members may not be able to use them at all.

Furthermore, because of the complexity, overhead, and intrusiveness of the devices as well as the need for privacy associated with using the devices, and in some cases costs, many families limit their use of the devices to situations in which they need to communicate an important message or a long message. When two family members connect by phone or computer, they may engage in a series of communications and remain engaged for a longer period of time than expected. For very busy families, they may intentionally avoid initiating a communication with another family for fear of becoming occupied in ongoing communications longer than they intended. In other words, they may avoid simply saying "hello" to each other for fear that a longer sequence of communications will ensue. In other situations where privacy cannot be assured, family members may simply choose not to establish communication. As a result, communication devices that are capable of supporting and typically used for long and in-depth conversations are not used for simple, short communications such as saying "hello" or "I'm thinking of you."

For a variety of reasons, family members that are separated from one another have or take few opportunities to simply say "hello" or "I'm thinking of you" to one another. There is a need for communication devices that support short and simple interactions between family members in different households. There is a need for communication devices that are easy to use, especially for very old and very young family members that may have difficulty using conventional communication devices such as telephones and computers. Finally, there is a need for communication devices that support ambient communications between family members in different households.

SUMMARY OF THE INVENTION

An interactive communication device in communication with a central communication server supports short, simple, ambient communications to and between two or more remotely located users. A computerized system connects the devices and allows multiple users to communicate with each other in an ambient way using the interactive devices. In an example embodiment, the communication devices are a set of interactive stuffed bears. In this embodiment, the computerized system is centered on a one-to-many interaction between a small child and several close family members or friends. Each bear has embedded sensors, lights, and speakers. The sensors allow the bear to sense 'outgoing' interaction, and the lights and speakers allow the bear to demonstrate 'incoming' interaction. The child's bear—the central bear—is activated when someone interacts with any of the other bears within the network. The other bears in the network—the peripheral bears—are activated both when the interaction originates from the central bear as well as from the other peripheral bears. In an example embodiment, peripheral bear interactions are more subtle than central bear activations to distinguish them from central bear activations.

In an example embodiment, each bear is equipped with a pressure sensor that measures a "squeeze," "hug," or "touch." One bear—the central bear—has the ability to provide two kinds of feedback by different actuators: sound and light. The two types of feedback allow each peripheral bear to trigger a unique or different effect in the central bear. The peripheral bears also have both feedback mechanisms to show a different reaction when the central bear has been squeezed, hugged, or touched. The communication devices allow the users in the network to send short and simple "hello" or "I'm thinking of you" messages by simply physically interacting with a bear or similar type of item equipped with the sensors, actuators, and electronics.

DETAILED DESCRIPTION

The present invention comprises a computerized network of ambient communication devices. In an example embodiment, the communication devices are stuffed bears that are equipped for communication via the network. In addition to bears and other animals, any item that can be equipped with the sensors and actuators may be used in the communication network in order to implement such tangible interaction and interface. Such items include dolls, pillows, balls, and similar types of toys that may be squeezed, hugged, or touched.

Each bear is equipped with an embedded pressure sensor that measures a "squeeze," "hug," or "touch." One bear is designated as the central bear and other bears are designated as peripheral bears. The central bear has the ability to provide two or more kinds of feedback (such as a sound, vibration, or glowing element) while the peripheral bears have one feedback mechanism. When a user interacts with the central bear, the feedback mechanism (actuators) in the peripheral bears is triggered. When users of the peripheral bears respond, the different feedback mechanisms in the central bear are triggered to distinguish the feedback from each peripheral bear. Each peripheral bear may trigger a different effect in the central bear.

Figure 1:
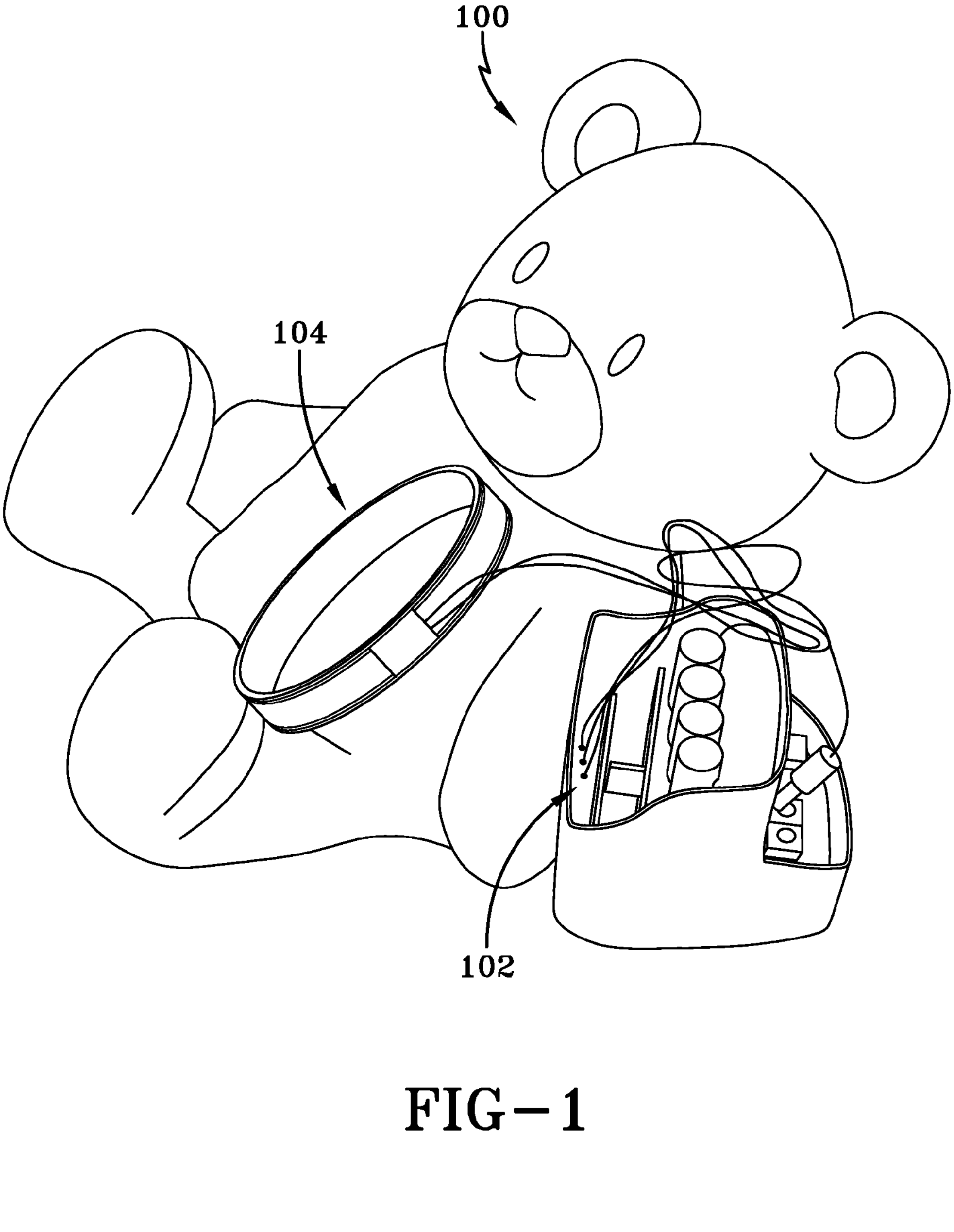
FIG. 1 is a sample ambient communication device 100 in the form of a bear.

In an example embodiment, each bear or other ambient communication device is equipped with the following components. Referring to FIG. 1, a sample ambient communication device 100 in the form of a bear is shown.

TABLE 1

| Device Equipment | |
|---|---|
| Component | Description |
| Microcontroller 102 | To control communication in the device. The microcontroller is connected to the sensors and actuators. In an example embodiment, an Arduino ™ microcontroller is programmed to provide the features and functionality of the ambient devices. |
| WiFi Serial Bridge | To facilitate communications between the ambient devices and central server |
| TTL Conversion | To facilitate communications between the ambient devices and central server |
| Battery with Charger | To provide power to the ambient devices. The devices may need to be recharged periodically to permit communication with the WiFi network. |
| WAV Shield/Speaker | To provide audio output |
| LEDs | To provide visual output |
| Sensor Circuit 104 | To receive tactile input (embedded forcing sensor) |
| WiFi Router | To facilitate communications between the ambient devices and central server |

Figure 2:
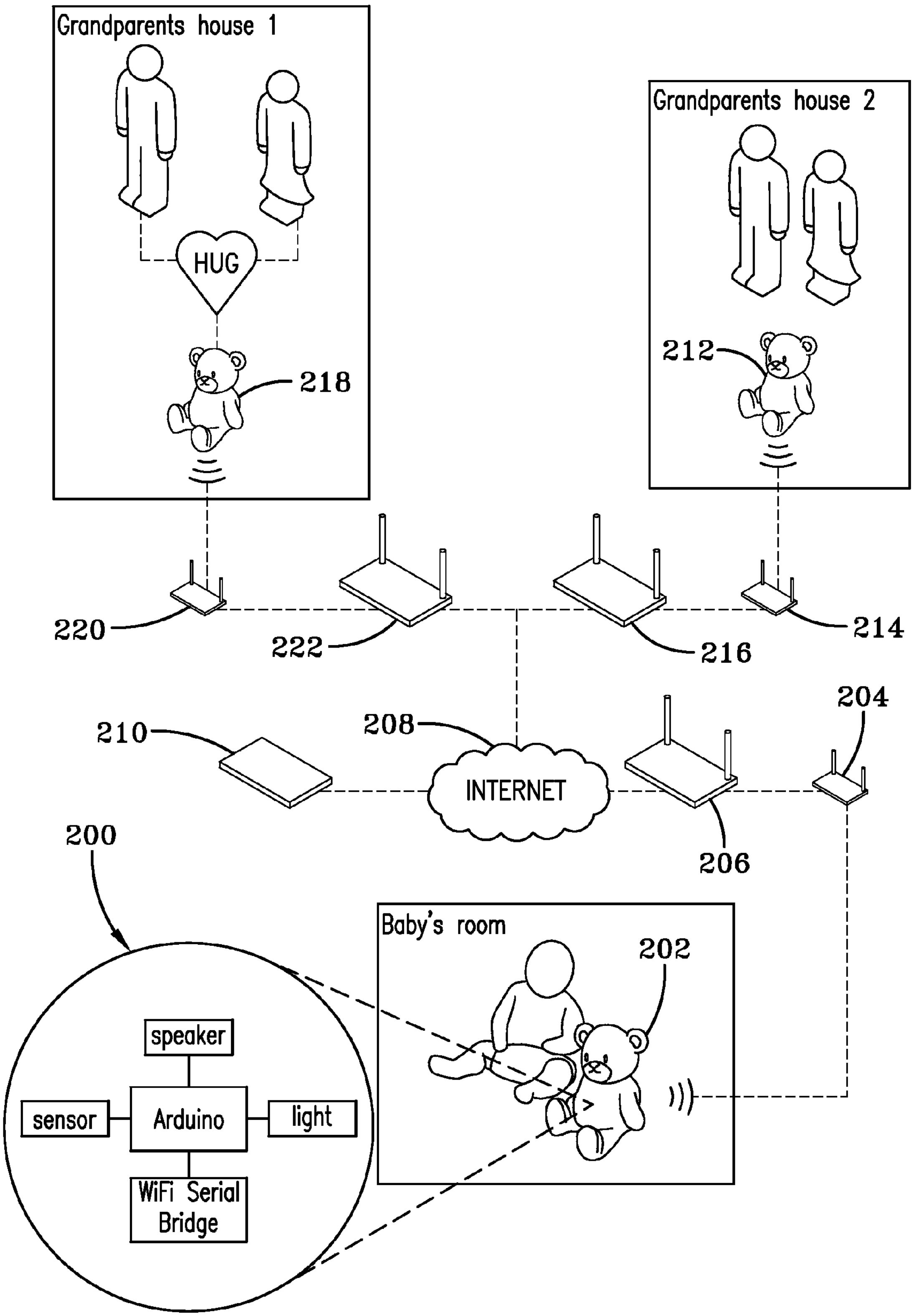
FIG. 2 is a diagram of a computer system architecture according to an example embodiment.

Referring to FIG. 2, a diagram of a computer system architecture according to an example embodiment is shown. In an example embodiment, each bear is equipped with a microcontroller, a WiFi serial bridge, a tactile sensor, a light or other glowing element, and a speaker 200. The bears are distributed to users that are located remotely from one another (i.e., in different households). For example, a central bear 202 may be given to a child and the peripheral bears 212, 218 may be given the child's maternal grandparents and paternal grandparents, respectively. Each bear 202, 212, 218 communicates via a respective base station 204, 214, 220 and home network router 206, 216, 222. Communications are routed through the Internet 208 to a central server 210 that manages the communications between the devices by sending appropriate messages to each device.

A software application at the server 210 controls the triggers and responses at the bears 202, 212, 218. In an example embodiment, one bear is designated at the server to be the "central" bear while the other bears in the network are "peripheral" bears. The bears may be used to facilitate communications between members of a family. The ambient communication devices are particularly useful in facilitating communications between a grandchild and grandparents, especially if the grandchild is so young as to be unable to use a telephone or computer without assistance from an adult.

In an example embodiment, the communication server runs on a Mac in a MAMP (Mac, Apache, MySQL, PHP) structure. In the example embodiment, the bears communicate on an 802.11b network over TCP/IP with the central communication server that accepts and dispatches messages. Bears can poll the server asynchronously using HTTP, with arbitrary frequency, to report interactions and collect feedback messages (e.g., sound and light ASCII encoded messages). Interaction messages (or tactile input messages) are sent to the communication server by the bears using HTTP-get-requests, and then the communication server, according to rules defined in PHP server scripts, prepares display output messages for feedback (e.g., sound and light messages). A MySQL database on the server stores the feedback messages or display output messages (e.g., sound and light messages) for each bear until it polls the server HTTP to retrieve them. Once a bear has polled the server and received any waiting messages, the messages are cleared from the database.

Figure 3:
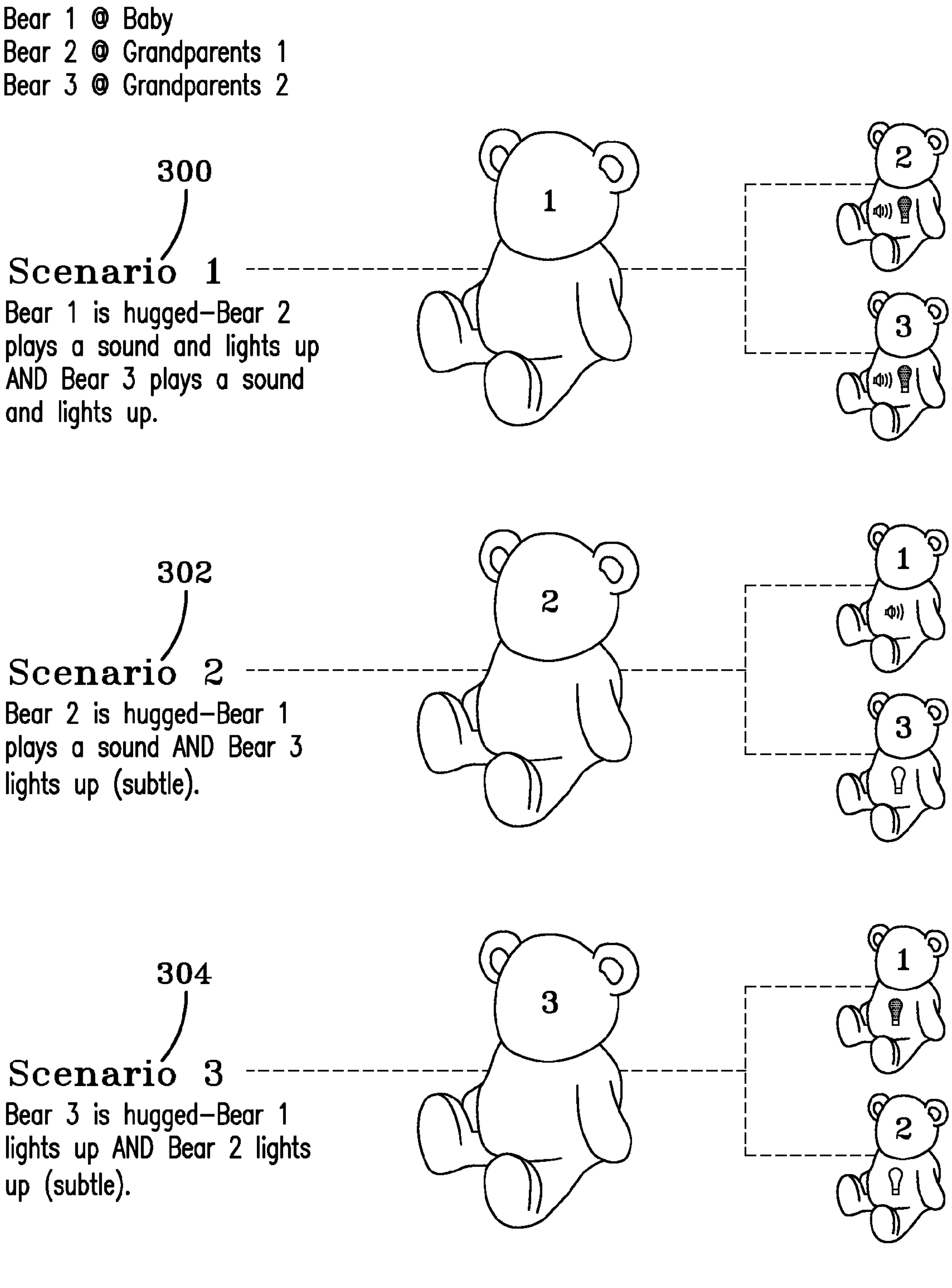
FIG. 3 is a diagram illustrating various communication scenarios.

Referring to FIG. 3, a diagram illustrating various communication scenarios is shown. In the scenarios, the central bear (Bear 1) is controlled by a child, a first peripheral bear (Bear 2) is controlled by the child's maternal grandmother or grandfather, and a second peripheral bear (Bear 3) is controlled by the child's paternal grandmother or grandfather.

TABLE 2

| Example Scenarios | | |
|---|---|---|
| Scenario | Response 1 | Response 2 |
| Bear 1 is hugged 300 | Bear 2 plays a sound and lights up | Bear 3 plays a sound and lights up |
| Bear 2 is hugged 302 | Bear 1 plays a sound | Bear 3 lights up (subtle) |
| Bear 3 is hugged 304 | Bear 1 lights up | Bear 2 lights up (subtle) |

As indicated in the scenarios, each peripheral bear (i.e., each grandparent's bear) responds when the grandchild interacts with the central bear. When each grandparent responds by interacting with a peripheral bear (e.g., squeezing or hugging), the central bear responds with a communication that uniquely identifies the peripheral bear (i.e., the respective grandparent). For example, the central bear may play a sound when the first peripheral bear is squeezed and blink a light when the second peripheral bear is squeezed. The sound may be a recording of a voice, music, etc. In addition, each peripheral bear responds when the other peripheral bear is squeezed. The response at the non-initiating peripheral bear may be subtle so that the user recognizes that the communication was initiated at a peripheral bear rather than the central bear. For example, the response may be a short, soft display of a sound or light.

In other embodiments of the invention, the ambient communication devices may be configured to provide various types of sensory feedback including vibrations or other forms of tactile feedback as well as visual, aural, and vocal feedback. Various combinations and patterns of feedback may be used to allow individuals in the network to distinguish communications received from the different users. User interactions with the device may be vocal in addition to tactile. A variety of input or interaction and output or feedback messages may be supported. The ambient communication devices may also take on a variety of forms, shapes, sizes, appearances, etc. depending upon the needs of the users. One of skill in the art would recognize that many different types of ambient communication devices could be designed and configured to provide the described communication features and functionality.

The disclosed ambient communication devices allow remotely located family members to spontaneously "touch" one another. When a user's bear plays a sound, displays a light, etc., the user knows that another family member is sending a squeeze or hug. The user receiving the "squeeze," "hug," or "touch" through the device can return a "squeeze," "hug," or "touch" to the sender. The invention allows family members and friends to communicate with one another in a new and different way.

While certain embodiments of the present invention are described in detail above, the scope of the invention is not to be considered limited by such disclosure, and modifications are possible without departing from the spirit of the invention as evidenced by the claims. For example, specific features of the ambient communication devices may be modified in a variety of ways but still allow for remote communications as described. Other aspects of the architecture and overall communication model may be varied and fall within the scope of the claimed invention. One skilled in the art would recognize that such modifications are possible without departing from the scope of the claimed invention.

What is claimed is:

1. A method for communication between remotely located users, the method comprising:

(a) entering in a server identifying data for at least three functionally identical communication devices, each of said communication devices comprising:
  (i) a microcontroller and wireless connection for communicating with said server;
  (ii) at least one embedded sensor circuit for receiving tactile input from a user where said input is selected from the group consisting of: squeezing or hugging said communication device;
  (iii) at least one feedback actuator for presenting output to said user; and
  (iv) a housing formed from a stuffed animal toy;
(b) designating at said server as a central device one of said plurality of communication devices;
(c) designating at said server as peripheral devices, the remaining of said plurality of devices;
(d) receiving at said server from said central device a tactile input message representing a received hug or squeeze, said message initiated in response to a user of said central device interacting with an embedded sensor circuit in said central device; and
(e) in response to receiving said tactile input message, transmitting from said server to said peripheral devices an output message for presenting output at said peripheral devices using said feedback actuator;
(f) receiving at said server from at least one peripheral device an interaction message initiated in response to said user of said at least one peripheral device interacting with said at least one peripheral;
(g) transmitting from said server to said central device a feedback output message for providing feedback to said user of said central device; and
(h) transmitting from said server to any additional peripheral devices, an interaction message in response which indicates that said at least one peripheral device has initiated said interaction message.

2. The method of claim 1 wherein said at least one feedback actuator comprises a visual feedback actuator.

3. The method of claim 2 wherein said visual feedback actuator triggers a light.

4. The method of claim 1 wherein said at least one feedback actuator comprises an aural feedback actuator.

5. The method of claim 4 wherein said aural feedback actuator triggers a music recording.

6. The method of claim 1 further comprising:

(f) receiving at said server from said peripheral device a tactile input message initiated in response to said user of said peripheral device interacting with an embedded sensor circuit in said peripheral device; and
(g) transmitting from said server to said central device an output message for said feedback actuator.

7. The method of claim 6 further comprising:

(h) transmitting from said server to at least one other peripheral device an output message for said feedback actuator.

8. A system for communication between remotely located users, the system comprising:

(a) a plurality of compressible housings, each in the shape of an animal, each housing further comprising a functionally identical electronic circuit, such electronic circuit comprising:
  (i) a communication device, said communication devices comprising:
    (A) a microcontroller in electronic communication with a wireless communication circuit configured for communicating with a server;
    (B) a memory in communication with the microcontroller;
    (C) an embedded tactile input sensor circuit for receiving tactile input from a user, such tactile input selected from the group of: squeezing, hugging, or compressing said housing, said tactile input sensor in electronic communication with said microcontroller; and
    (D) at least one feedback actuator in electronic communication with said microcontroller for presenting output to said user, at least one of said feedback actuator selected from a group comprising a feedback actuator transmitting vibrations to the housing, or a feedback actuator producing a sound;
(b) a server in communication with said plurality of compressible housings wherein:
  (i) said communications device of one of said plurality of compressible housings is designated at said server to be a central device without changing the configuration of the device itself;
  (ii) at least one of said communications devices of one of said plurality of compressible housings not designated as a central device is designated at said server to be a peripheral device, said server being configured to communicate with the microcontroller of the designated central device to cause the feedback actuator of said designated central device to react to a tactile input received from the tactile input sensor of one or more of such devices designated as peripheral devices;
  (iii) said server is configured to receive from said central device a tactile input message initiated in response to a user of said central device interacting with the embedded tactile input sensor circuit in said central device; and
  (iv) said server is configured to transmit upon receipt of such a tactile input message, an output message to said peripheral device(s) which causes an output to be produced by said feedback actuator of each peripheral device(s);
  (v) said server receives from one of said peripheral devices, a tactile input message initiated in response to said user of said peripheral device interacting with an embedded sensor circuit in said peripheral device;
  (vi) said server transmits to said central device an output message as the result of said received tactile input message; and (vii) said server transmits to at least one other peripheral device an output message as the result of said received tactile input message.

9. The system of claim 8 wherein said at least one feedback actuator further comprises a visual feedback actuator.

10. The system of claim 9 wherein said visual feedback actuator triggers a light.

11. The system of claim 8 wherein said aural feedback actuator triggers a music recording.

12. A system for communication between remotely located users, the system comprising:

(a) a plurality of compressible housings, each in the shape of an animal, each housing further comprising a functionally identical electronic circuit, such electronic circuit further comprising:

(i) a communication device, said communication devices comprising:

(A) a microcontroller in electronic communication with a wireless communication circuit configured for communicating with a server;

(B) a memory in communication with the microcontroller;

(C) an embedded tactile input sensor circuit in communication with said microcontroller, said embedded tactile input sensor configured to receive input from a user, such tactile input selected from the group of: squeezing, hugging, or compressing said housing; and (D) at least one feedback actuator in electronic communication with said microcontroller, said feedback actuator configured for presenting feedback output to said user, at least one of said feedback actuator selected from a group comprising a feedback actuator transmitting vibrations to the housing, or a feedback actuator producing a sound where such sound is selected from a list including a tone, prerecorded music, and prerecorded voice sounds, said feedback actuator further comprising a visual feedback function in the form of an indicator light;

(b) a server in communication with said plurality of compressible housings wherein:

(i) said communications device of one of said plurality of compressible housings is designated at said server to be a central device without changing the configuration of the device itself;

(ii) at least one of said communications devices of one of said plurality of compressible housings not designated as a central device is designated at said server to be a peripheral device, said server being configured to communicate with the microcontroller of the designated central device to cause the feedback actuator of said designated central device to react to a tactile input received from the tactile input sensor of one or more of such devices designated as peripheral devices;

(iii) said server is configured to receive from said central device a tactile input message initiated in response to a user of said central device interacting with the embedded tactile input sensor circuit in said central device; and (iv) said server is configured to transmit upon receipt of such a tactile input message, an output message to said peripheral device(s) which causes an output to be produced by said feedback actuator of each peripheral device(s);

(v) said server receives from one of said peripheral device, a tactile input message initiated in response to said user of said peripheral device interacting with an embedded sensor circuit in said peripheral device;

(vi) said server transmits to said central device an output message as the result of said received tactile input message; and (vii) said server transmits to at least one other peripheral device an output message as the result of said received tactile input message.

* * * * *